US011720720B2

(12) United States Patent
Ha et al.

(10) Patent No.: US 11,720,720 B2
(45) Date of Patent: Aug. 8, 2023

(54) DEVICE AND METHOD FOR AUTOMATICALLY GENERATING AUTOCAD DRAWINGS, AND NON-TRANSITORY COMPUTER-READABLE MEDIUM RECORDED THEREON COMPUTER PROGRAM THEREFOR

(71) Applicants: Samsung Engineering Co., Ltd., Seoul (KR); KANG, Tae Woog, Gwangju (KR)

(72) Inventors: Gyun Ho Ha, Seoul (KR); Nae Hyuck Lee, Seoul (KR); Jong In Yoon, Seoul (KR); Jin Kim, Seoul (KR); Geun Yong Choi, Seoul (KR); Sung Mo Park, Seoul (KR); Ji Yoon Hyun, Seoul (KR); Hu Jung Nam, Seoul (KR); Jun Soo Park, Seoul (KR); Byueong Kook Cheo, Gwangju (KR); Dae Seong Kim, Gwangju (KR)

(73) Assignees: SAMSUNG ENGINEERING CO., LTD., Seoul (KR); TAE WOOG KANG, Gwangju (KR)

( * ) Notice: Subject to any disclaimer, the term of this patent is extended or adjusted under 35 U.S.C. 154(b) by 0 days.

(21) Appl. No.: 17/861,859

(22) Filed: Jul. 11, 2022

(65) Prior Publication Data
US 2023/0060234 A1    Mar. 2, 2023

(30) Foreign Application Priority Data
Aug. 18, 2021    (KR) .................. 10-2021-0108962

(51) Int. Cl.
*G06F 30/12*    (2020.01)
(52) U.S. Cl.
CPC ..................... *G06F 30/12* (2020.01)

(58) Field of Classification Search
CPC ....... G06F 30/12; G06F 30/17; G06F 2111/00; G06F 2119/22
See application file for complete search history.

(56) References Cited

U.S. PATENT DOCUMENTS

| 11,010,531 B2* | 5/2021 | Cho .................. G06K 9/6267 |
| 2006/0156262 A1* | 7/2006 | Abe ............... G01R 31/318371 |
| | | 716/106 |

(Continued)

FOREIGN PATENT DOCUMENTS

| JP | 2004101066 A | * | 4/2004 | ............... F24H 9/00 |
| JP | 2005147422 A | * | 6/2005 | ............... F25B 1/00 |

(Continued)

OTHER PUBLICATIONS

Gao P, Sang ZF. Three dimensional parameterized design of heat exchanger tubesheet based on SolidWorks. In2008 9th International Conference on Computer-Aided Industrial Design and Conceptual Design Nov. 22, 2008 (pp. 488-492). IEEE. (Year: 2008).*

(Continued)

*Primary Examiner* — Chuen-Meei Gan
(74) *Attorney, Agent, or Firm* — Panitch Schwarze Belisario & Nadel LLP

(57) ABSTRACT

A method of automatically generating AutoCAD drawings includes: generating a data sheet by using only input data which is necessary for generating drawings of a heat exchanger and obtained from strength calculation data provided by a strength calculation program; loading the data sheet by a loading unit; and generating AutoCAD drawings of the heat exchanger by activating an automatic AutoCAD drawing generation interface by a user's selection, the automatic AutoCAD drawing generation interface being activatable only after the data sheet may be loaded, wherein the input data includes both machine data and thermal data.

13 Claims, 14 Drawing Sheets

(56) References Cited

U.S. PATENT DOCUMENTS

| | | | |
|---|---|---|---|
| 2018/0260501 A1* | 9/2018 | Dweik | G06N 20/00 |
| 2020/0004225 A1* | 1/2020 | Buller | B29C 64/393 |

FOREIGN PATENT DOCUMENTS

| | | | | |
|---|---|---|---|---|
| JP | 2006-065742 A | 3/2006 | | |
| KR | 381863 B1 * | 5/2003 | | G06Q 50/04 |
| KR | 20090036354 A | 4/2009 | | |
| KR | 20130066356 A | 6/2013 | | |
| KR | 101757451 B1 | 7/2017 | | |

OTHER PUBLICATIONS

Mane VN. Quality Improvement in Design Process of Shell & Tube Type Heat Exchanger by Computer Integrated 3D Modeling. (Year: 2015).*

Guo XP, Zheng W, Wu YC. The Application of VB Matlab and AutoCAD in IC Engine Optimization Design. InApplied Mechanics and Materials 2014 (vol. 543, pp. 1951-1954). Trans Tech Publications Ltd. (Year: 2014).*

Koziolek H, Rückert J, Berlet A. Industrial plant topology models to facilitate automation engineering. In International Conference on Systems Modelling and Management Jun. 25, 2020 (pp. 91-108). Springer, Cham. (Year: 2020).*

A classification framework for automated control code generation in industrial automation, Heiko Koziolek etc., Journal of System and Software, vol. 166, 110575, Aug. 2020 See fig. 3, p. 3-8 (Year: 2019).*

International Search Report dated Nov. 22, 2022, corresponding to PCT/KR2021/020305 (10 Pages).

* cited by examiner

FIG. 5

| Tubes | |
|---|---|
| Tube Coordinates – x | Tube Coordinates – y |
| −22.00 | −234.50 |
| −53.75 | −234.50 |
| −85.50 | −234.50 |
| −117.25 | −234.50 |
| −149.00 | −234.50 |
| −180.75 | −234.50 |
| −212.50 | −234.50 |
| −244.25 | −234.50 |
| −276.00 | −234.50 |

FIG. 6

```
File  Edit  Search ...
<tagNumber></tagNumber>
<tagClass></tagClass>
<tagcategory></tagcategory>
<!-- Design Code Info --> 
<designCode>ASME Section VIII Division 1</designCode>
<designCodeEdition>2017</designCodeEdition>
<!-- Vessel Data -->
<units>S.I.<units>
    <outerDiameter units="mm">671.60</outerDiameter>
    <innerCorrosion units="mm">0.00</innerCorrosion>
    <outerDiameter units="mm">0.00</outerDiameter>
    <nominalThickness units="mm">31.00</nominalThickness-units>
    <length units>2438.40</length>
    <designPressure units>="kPa">8000.00</designPressure>
    <designTemperature units>="degC">343.33</designTemperature units>
    <externalPressure units>="kPa">103.42</externalPressure units>
    <externalTemperature units>="degC">343.33</externalTemperature units>
    <designMDMT units>="degC">-90.00</designMDMT units>
    ...
```

320b

| 1) Design Data | |
|---|---|
| CODE | ASME Section VIII Division 1:2017 |
| SPECIFIC GRAVITY | 0.86 |
| LETHAL/TOXIC SERVICE (YES/NO) | No |
| DESIGN INTERNAL PRESSURE | 8000 |
| DESIGN EXTERNAL PRESSURE | 103.42 |
| DESIGN INTERNAL TEMPERATURE | 343.33 |
| DESIGN EXTERNAL TEMPERATURE | 343.33 |
| CORROSION ALLOWANCE | 0 |
| R.T (HEAD) | FULL |
| R.T (SHELL) | FULL |
| JOINT EFFICIENCY (HEAD) | |
| JOINT EFFICIENCY (HEAD) | |
| POST WELD HEAT TREATMENT | None |
| STRESS RELIEVED | |
| HYDRO. TEST PRESSURE (AT SHOP) | 2460 |
| HYDRO. TEST PRESSURE (AT FIELD) | 2460 |
| PNEUMATIC TEST PRESSURE (AT SHOP) | |
| MAWP | 17 |
| MAP | 17 |
| MDMT | -33.15 |
| PWHT | None |
| INSULATION | N/A |
| FIREPROOFING (IN/OUT) | N/A |
| WIND CODE | ASCE |
| SEISMIC CODE | ASCE |
| IMPACT TEST | No |
| VOLUM | 7.9 |
| FABRICATION WEIGHT | |
| ERECTION WEIGHT | |
| EMPTY WEIGHT | 6220 |
| OPERATING WEIGHT | 12000 |
| FULL OF WATER WEIGHT | 14230 |

DEVICE AND METHOD FOR AUTOMATICALLY GENERATING AUTOCAD DRAWINGS, AND NON-TRANSITORY COMPUTER-READABLE MEDIUM RECORDED THEREON COMPUTER PROGRAM THEREFOR

CROSS-REFERENCE TO RELATED APPLICATION

This application is based on and claims priority under 35 U.S.C. § 119 to Korean Patent Application No. 10-2021-0108962, filed on Aug. 18, 2021, in the Korean Intellectual Property Office, the disclosure of which is incorporated by reference herein in its entirety.

BACKGROUND

1. Field

One or more embodiments relate to a method of automatically generating AutoCAD drawings by using strength calculation data.

2. Description of the Related Art

In the related art, users check data about strength calculation results obtained using a strength calculation program and then manually generate drawings by using a drawing tool of an AutoCAD program by manually inputting the data piece by piece to the drawing tool.

PRIOR ART DOCUMENTS

Patent Documents (Patent Document 1) KR 10-1757451 B1
(Patent Document 2) KR 10-2009-0036354 B1
(Patent Document 3) KR 10-2013-0066356 B1

SUMMARY

One or more embodiments include a method of automatically generating AutoCAD drawings of a heat exchanger according to intended shapes by using data on strength calculation results.

Additional aspects will be set forth in part in the description which follows and, in part, will be apparent from the description, or may be learned by practice of the presented embodiments of the disclosure.

According to one or more embodiments, a device for automatically generating AutoCAD drawings includes: a preprocessing unit configured to extract only input data having a first format, which is necessary for generating drawings of a heat exchanger, from data provided by a strength calculation program, and then convert the input data into a data sheet having a second format according to a given rule or reference; a loading unit configured to load the data sheet; and a viewer configured to use the loaded data sheet to display at least one selected from the group consisting of a shape of the heat exchanger and information on each of objects of the heat exchanger, wherein the viewer includes an automatic AutoCAD drawing generation interface which is activatable only after the data sheet is loaded and is configured to generate AutoCAD drawings of the heat exchanger displayed on the viewer as being activated by a user's selection after the data sheet is loaded, and the input data includes strength data and thermal data.

In an embodiment, the viewer may include: a shape display section configured to display the shape of the heat exchanger; a shape icon bar providing icons related to the shape of the heat exchanger; and a basic tab providing information on the objects of the heat exchanger.

In an embodiment, the shape icon bar may be divided into a front channel, a shell, and a rear channel, and may display icons respectively forming the front channel, the shell, and the rear channel; and the front channel, the shell, and the rear channel may include at least one icon selected from the group consisting of a flange, a shell, and a head.

In an embodiment, the shape icon bar may include at least one of a tube sheet, a floating head, and a baking device.

In an embodiment, the icons related to the shape of the heat exchanger may be displayed on the shape icon bar only when the mechanical data or the thermal data is provided from the data sheet.

In an embodiment, the thermal data may include thermal rating results for a tube arrangement.

In an embodiment, the thermal rating results may be obtained by inputting values extracted from the Heat Transfer Research Institute (HTRI) to the strength calculation program.

According to one or more embodiments, a method of automatically generating AutoCAD drawings includes: generating a data sheet by using only input data which is necessary for generating drawings of a heat exchanger and obtained from data provided by a strength calculation program; loading the data sheet by a loading unit; and generating AutoCAD drawings of the heat exchanger by activating an automatic AutoCAD drawing generation interface by a user's selection, the automatic AutoCAD drawing generation interface being activatable only after the data sheet is loaded, wherein the input data includes both strength data and thermal data.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5 to 7 illustrate examples of converting thermal and mechanical data into CSV data sheet formats according to embodiments;

FIG. 12 illustrates an example of an information providing section according an embodiment;

FIG. 12 illustrates an example of a preview_development elevation according an embodiment;

DETAILED DESCRIPTION

Figure 1:
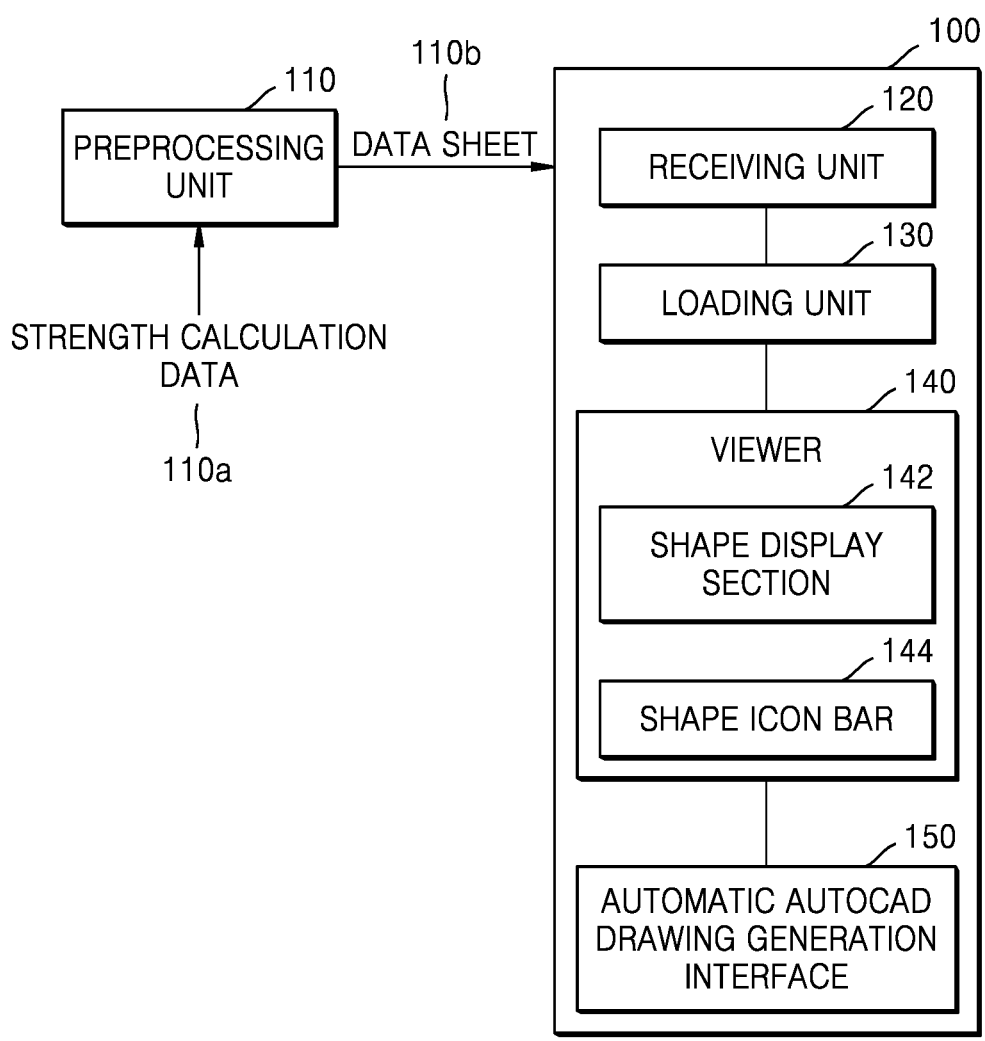
FIG. 1 illustrates an internal configuration of an automatic AutoCAD drawing generation device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described with reference to the accompanying drawings so that those of ordinary skill in the related art may clearly understand the scope of the present disclosure and may easily implement the idea of the present disclosure.

FIG. 1 illustrates an internal configuration of an automatic AutoCAD drawing generation device 100 according to an embodiment.

The automatic AutoCAD drawing generation device 100 and a preprocessing unit 110 may be respectively implemented in different terminals or may be integrally implemented in the same terminal. Examples of such terminals include computers, laptop computers, smartphones, tablets, handheld devices, and wearable devices. The term "terminal" refers to a device which includes a processor and a display and is capable of running applications or programs.

The automatic AutoCAD drawing generation device 100 may include a receiving unit 120, a loading unit 130, a viewer 140, and an automatic AutoCAD drawing generation interface 150. The automatic AutoCAD drawing generation device 100 may receive a data sheet 110b from the preprocessing unit 110. The preprocessing unit 110 may extract strength calculation data 110a about a heat exchanger from a strength calculation program. Examples of the heat exchanger include a shell-and-tube heat exchanger. A shell-and-tube heat exchanger may include two tube sheets, a plurality of heat transfer tubes connected to the two tube sheets, and an outer cylindrical shell as a closing structure, and may be used to exchange heat for heating, cooling, condensation, vaporization, or the like.

In an embodiment, the data sheet 110b refers to data used for drawing all objects of the heat exchanger. The data used for preparing drawings of the heat exchanger may include strength data and thermal data.

In an embodiment, the thermal data may include tube data, tie rod data, seal rod data, seal strip data, skid bar data, impingement plate data, impingement rod data, baffle data, or the like.

In an embodiment, the thermal data may include thermal rating results for tube arrangement. In an embodiment, the thermal data may be input to the strength calculation program to obtain the thermal rating results, or tube arrangement information obtained by inputting the thermal data to a heat exchanger program may be input to the strength calculation program to obtain the thermal rating results.

In the automatic AutoCAD drawing generation device 100, input data received through the receiving unit 120 may be loaded by the loading unit 130 and displayed on the viewer 140, and then the automatic AutoCAD drawing generation interface 150 may be activated to automatically generate AutoCAD drawings of the heat exchanger.

Figure 2:
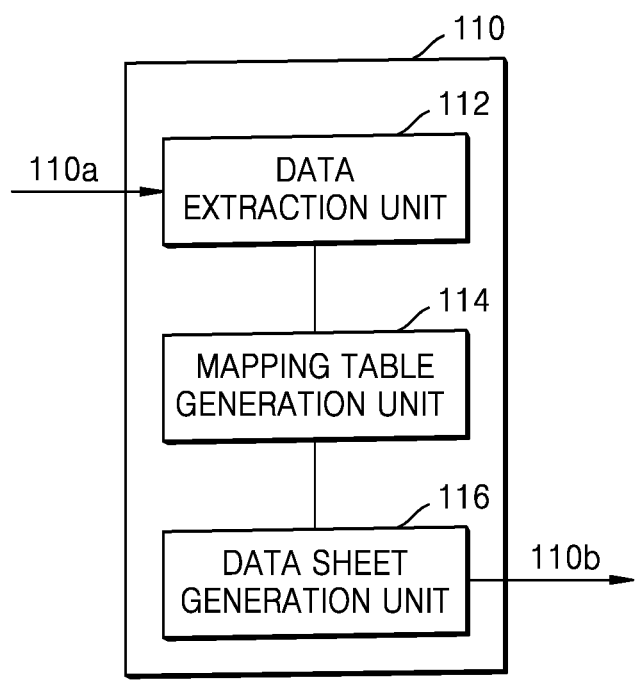
FIG. 2 illustrates an internal configuration of a preprocessing unit according to an embodiment.

Referring to FIG. 2, the preprocessing unit 110 mat extract only the data sheet 110b from the strength calculation data 110a received from the strength calculation program. To this end, the preprocessing unit 110 may include a data extraction unit 112, a mapping table generation unit 114, and a data sheet generation unit 116.

An example piece of the strength calculation data 110a, which is calculated by the strength calculation program with regard to a heat exchanger baffle, is as follows.

```
- <baffleGroup>
    <baffleMaterial>SA-36</baffleMaterial>
    <baffleType>Single Segmental</baffleType>
    <baffleOrientation>Horizontal</baffleOrientation>
    <shellClearance units="mm">3.20</shellClearance>
    <maxTemaShellClearance units="mm">3.20</maxTemaShellClearance>
    <baffleThickness units="mm">4.00</baffleThickness>
    <minTemaBaffleThickness units="mm">3.20</minTemaBaffleThickness>
    <baffleCorrosionAllowance units="mm">0.00</baffleCorrosionAllowance>
    <baffleDiameter units="mm">330.15</baffleDiameter>
    <baffleCount>26</baffleCount>
    <maxBaffleToBaffleDistance units="mm">420.00</maxBaffleToBaffleDistance>
    <maxTubesheetToBaffleDistance units="mm">604.00</maxTubesheetToBaffleDistance>
    <groupWeight units="kg">37.41</groupWeight>
    <tubeHoleDiameter units="mm">25.80</tubeHoleDiameter>
    <tubeHoleClearanceDescription>0.4mm per RCB-4.2</tubeHoleClearanceDescription>
- <Prototypes>
```

An example of the data sheet 110b, which is obtained by automatically converting the example piece of the strength calculation data 110a into a second format according to a given rule or reference, is shown in Table 1 below.

TABLE 1

| Baffles General | | | |
|---|---|---|---|
| Baffle Material | SA36 | Shell Clearance | 3.20 |
| Baffle Type | Single Segmental | maxBaffleToBaffleDistance | 420.00 |
|  |  | minTEMABaffleThickness | 3.20 |
| Baffle Orientation | Horizontal | Baffle Cut % | 23 |

TABLE 1-continued

Baffles General

| | |
|---|---|
| Baffle Thickness | 4.00 |
| Baffle Diameter | 330.15 |
| Baffle Count | 26 |
| Tube Hole Diameter | 25.80 |
| Tube Hole Clearance | 0.4 mm per RCB-4.2 |

Hereinafter, each element of the preprocessing unit 110 will be described with reference to FIGS. 3 to 7, and then the receiving unit 120, the loading unit 130, the viewer 140, and the automatic AutoCAD drawing generation interface 150 will be described with reference to FIGS. 8 to 16.

The data extraction unit 112 may receive mechanical data (input data 310 shown in FIG. 3) and thermal data (input data 410 shown in FIG. 4) about the heat exchanger from the strength calculation program. FIG. 5 illustrates an example data sheet 500, which is obtained by converting thermal data into a CSV format.

Figure 3:
FIGS. 3 to 4 illustrate an example of mechanical data and an example of thermal data, which are provided by a strength calculation program according to embodiments.
Figure 4:
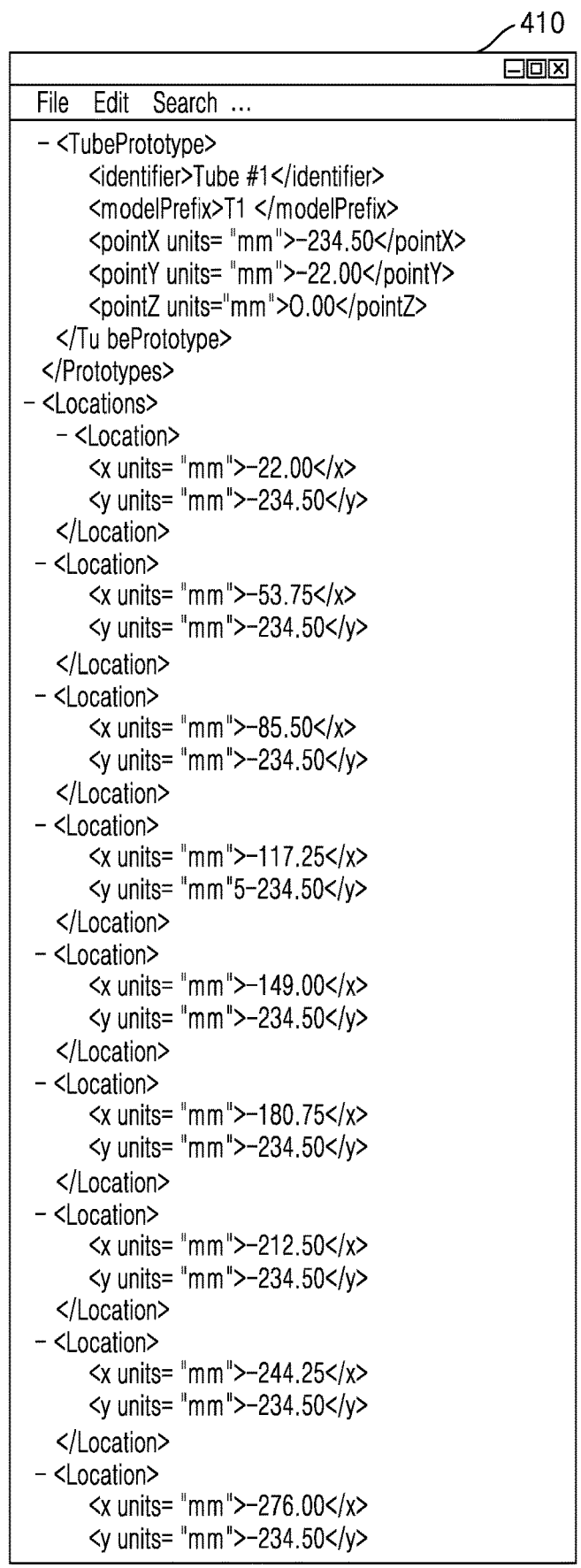

The data extraction unit 112 may extract input data, such as the input data 310 shown in FIG. 3 or the input data 410 shown in FIG. 4, from received strength calculation data. In this case, the input data 310 and the input data 410 may be XML data, but are not limited thereto and may have various other formats.

The input data 310 and the input data 410 may include general information, design data, a material list, a nozzle list, closure-cover data, closure-head data, channel cover flange data, front channel cylinder data, front channel flange data, front tube sheet data, shell flange data, shell transition data, shell cylinder data, shell-expansion joint data, rear tube sheet data, baking device data, rear channel flange data, rear channel cylinder data, channel cover flange data, inner head-flange data, inner head-float head data, saddle data, tube general information, tube and rod locations, data on other auxiliaries, and baffle data.

The front tube sheet data or the rear tube sheet data may include at least one selected from the group consisting of a start elevation, an end elevation, an outer diameter, a nominal thickness, an extension thickness, a pass groove depth, a pass groove width, a shell side diameter, a shell side depth, a tube side diameter, a tube side depth, a tube fit, a tube hole clearance, a clad or weld overlay thickness on a shell side or tube side, and material information.

The shell-expansion joint data may include at least one selected from the group consisting of a distance to a front tube sheet, a length, a material, an FSE number, an outer diameter, an inner diameter, a thickness, an outer knuckle, an inner knuckle, and an FSE cylinder type.

The baking device data may include at least some of information such as a start elevation, an end elevation, a flange type, and a thickness, and information such as an angle, a bolt size, a bolt length, and a bolt hole diameter.

The inner head-flange data may include at least some of information such as a start elevation, an end elevation, a flange type, and a thickness, information such as an angle, a bolt size, a bolt length, and a bolt hole diameter, and gasket-related information.

The inner head-float head data may include at least one selected from the group consisting of a start elevation, an end elevation, an inner diameter, a flange-related information, and a head-related information.

The tube general information may include at least some of information such as a tube pattern, a pitch, a material, a number, a length, a thickness, and a projection.

The baffle data may include at least some of information such as baffle material, type, orientation, thickness, diameter, number, hole diameter, and hole clearance.

Referring back to FIG. 2, the data extraction unit 112 may extract data values from a plurality of preset positions of input data having a first format. Referring to FIG. 6, the data extraction unit 112 may extract input data required for preparing drawings by extracting values of items of input data 320b, for example, by extracting "ASME Section VIII Division 1" which matches "designCode" and "2017" which matches "designCodeEdition," and then entering the extracted strings in a "CODE" item on the right side, which is a reference design code.

Figure 7:
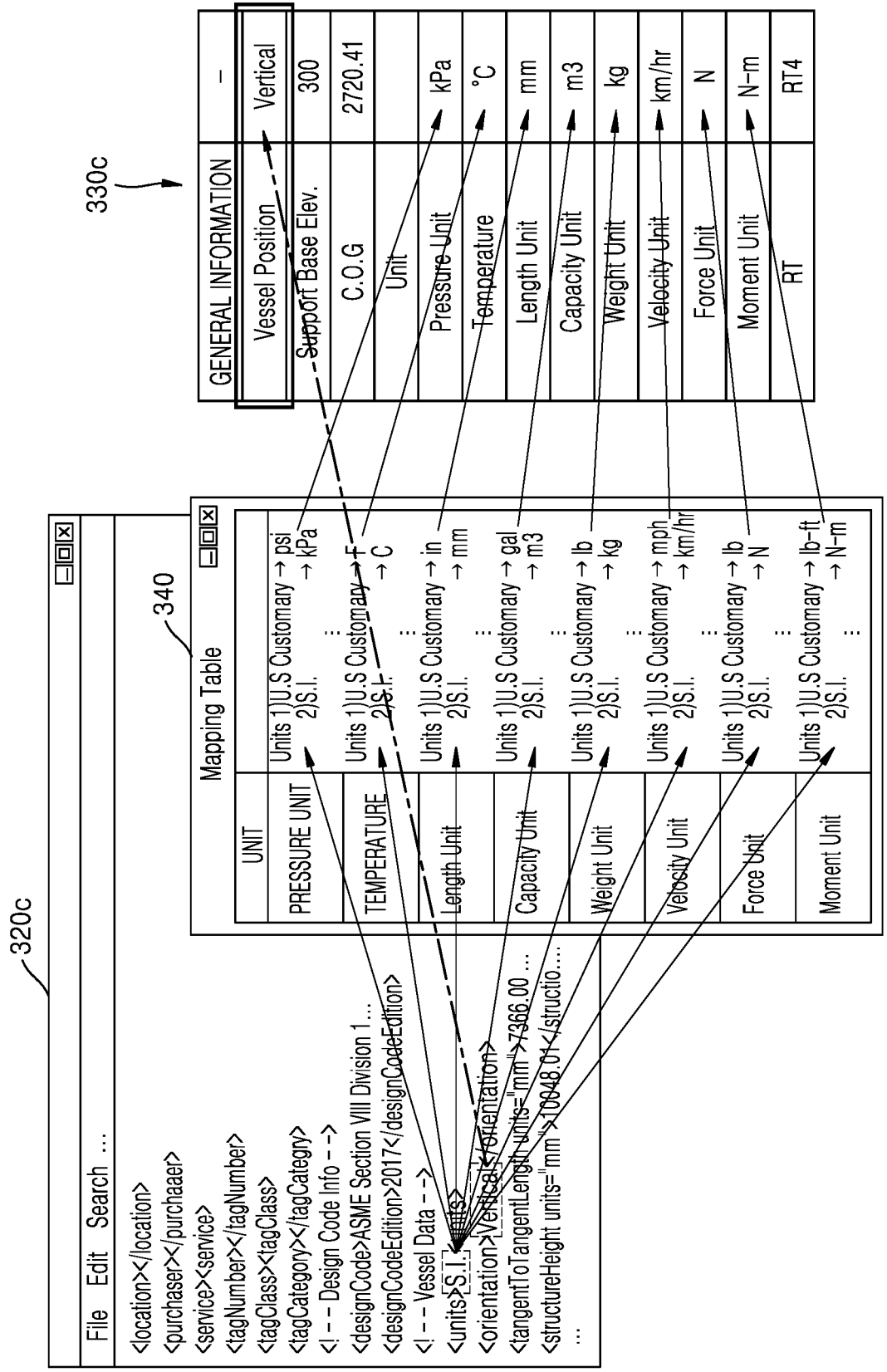

Referring to FIG. 7, the mapping table generation unit 114 may generate a mapping table 340 to provide general information 330c, which includes information on units corresponding to preset items for preparing drawings of all the objects of the heat exchanger.

The data sheet generation unit 116 may generate a data sheet in a second format by using the input data 320b extracted by the data extraction unit 112 in the manner shown in FIG. 6 and the mapping table 340 shown in FIG. 7. The data sheet may be generated in a CSV format.

Figure 8:
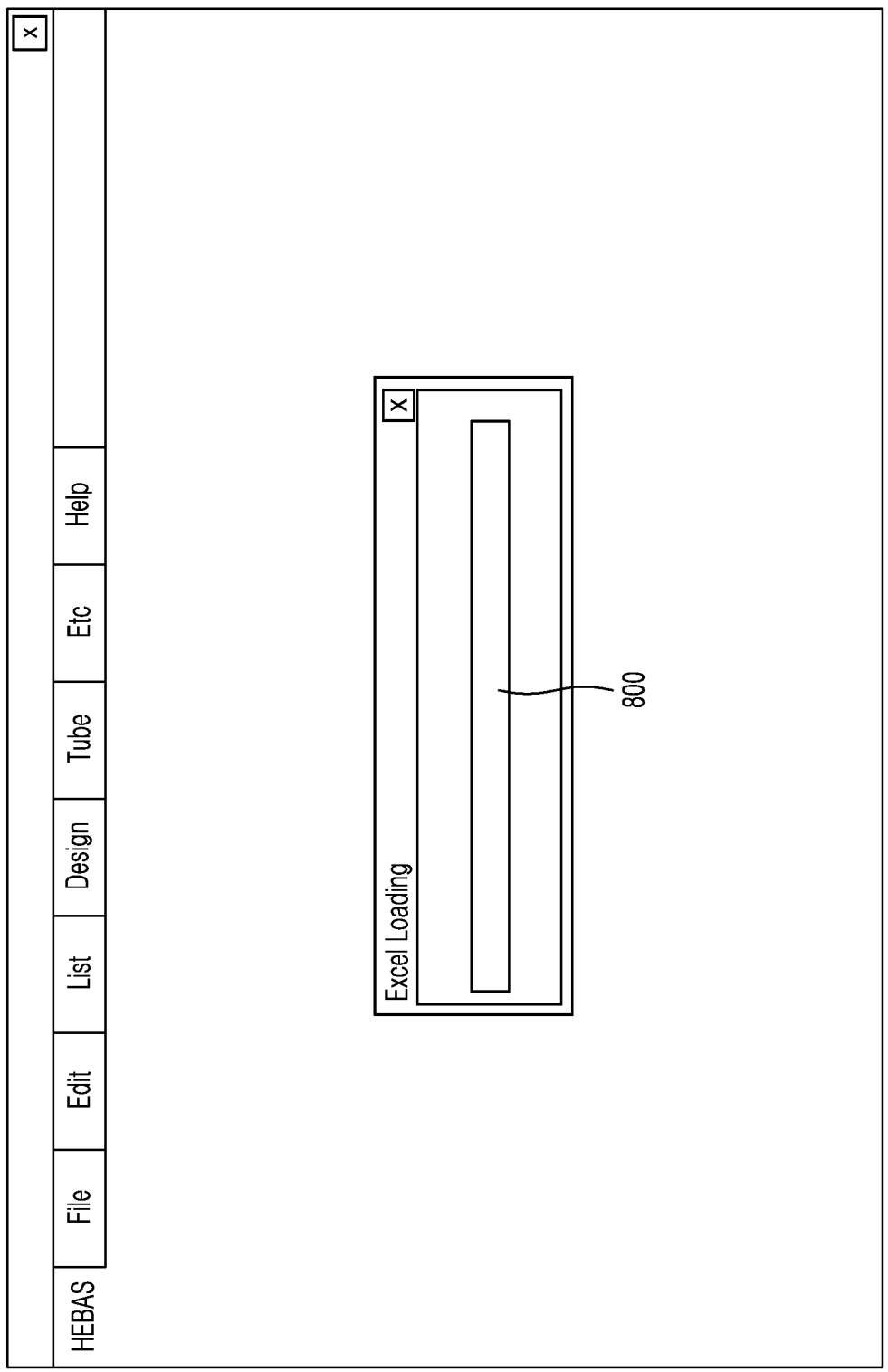
FIG. 8 illustrates an example of loading input data in an automatic AutoCAD drawing generation device according an embodiment.

Returning back to FIG. 1, the receiving unit 120 may receive the data sheet 110b from the preprocessing unit 110, and the loading unit 130 may load the data sheet 110b in the automatic AutoCAD drawing generation device 100. FIG. 8 illustrates an example of loading by a loading unit 800.

Referring to FIG. 8, before the loading of the data sheet 110b is completed, the automatic AutoCAD drawing generation device 100 does not have information on the components of the heat exchanger of which drawings will be generated, and only basic tabs for providing information on the objects of the heat exchanger are provided.

Figure 9:
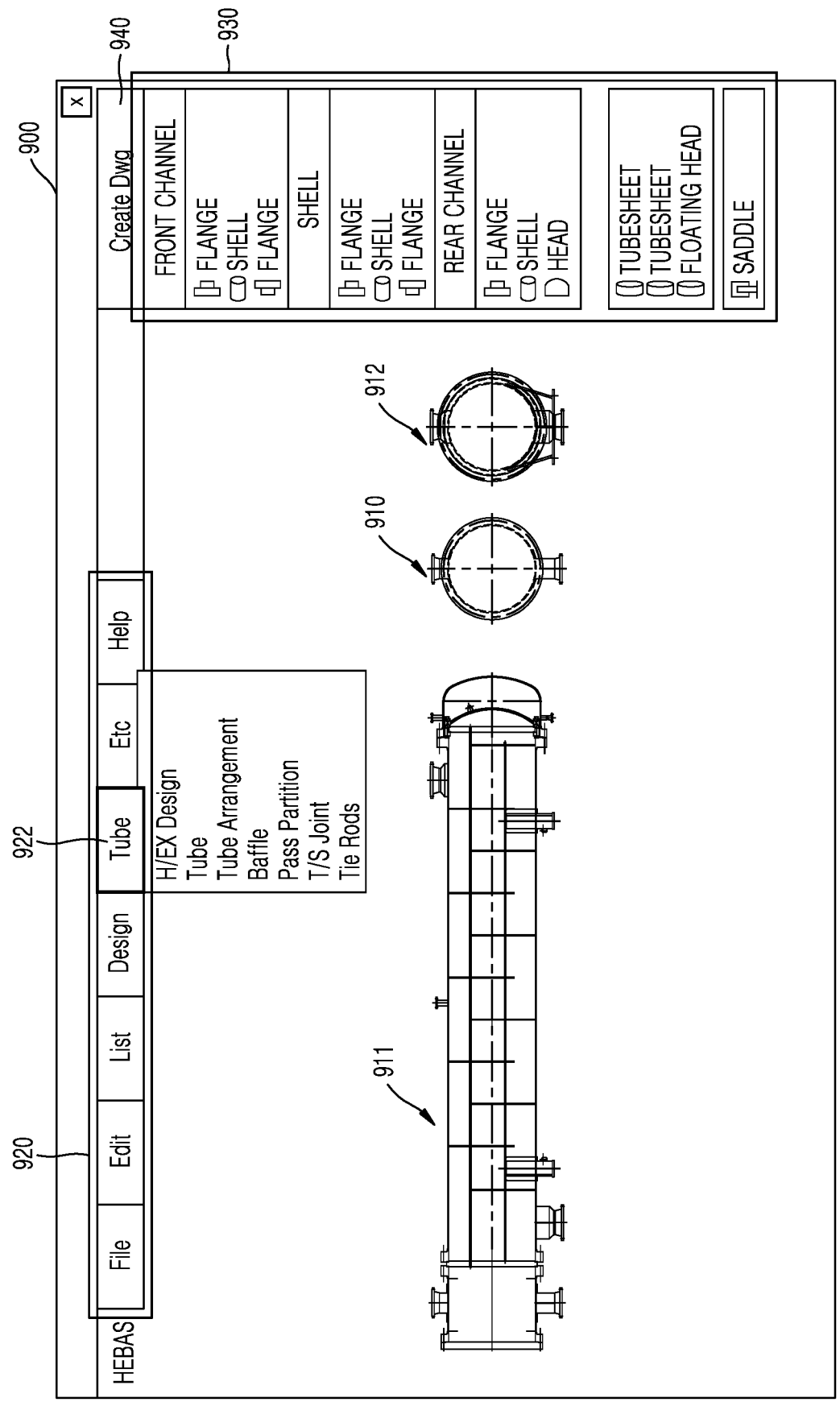
FIG. 9 illustrates an example of an automatic AutoCAD drawing generation device in which input data is loaded according an embodiment.

When the loading of the data sheet 110b is completed, a viewer 900 may display, on a shape display section 910, at least one of a shape 911 of the heat exchanger and a multi-section orientation 912 of the heat exchanger as shown in FIG. 9. When the loading of the data sheet 110b is completed, the viewer 900 may generate a shape icon bar 930 that provides icons for forming the shape of the heat exchanger.

The shape icon bar 930, which is divided into FRONT CHANNEL, SHELL, and REAR CHANNEL, may be displayed. Each of FRONT CHANNEL, SHELL, and REAR CHANNEL may include at least one icon selected from the group consisting of FLANGE, SHELL, and HEAD. The shape icon bar 930 may further display at least one icon selected from the group consisting of TUBESHEET, FLOATING HEAD, and BAKING DEVICE. The icons may be displayed in the shape icon bar 930 only when mechanical data or thermal data is provided from the data sheet 110b.

In an embodiment, when the loading of the data sheet 110b is completed, a user may activate an automatic AutoCAD drawing generation interface 940 in the viewer 900. When the automatic AutoCAD drawing generation interface 940 is activated, a CAD drawing 1400 of the heat exchanger may be generated as in an example shown in FIG. 14.

Figure 10:
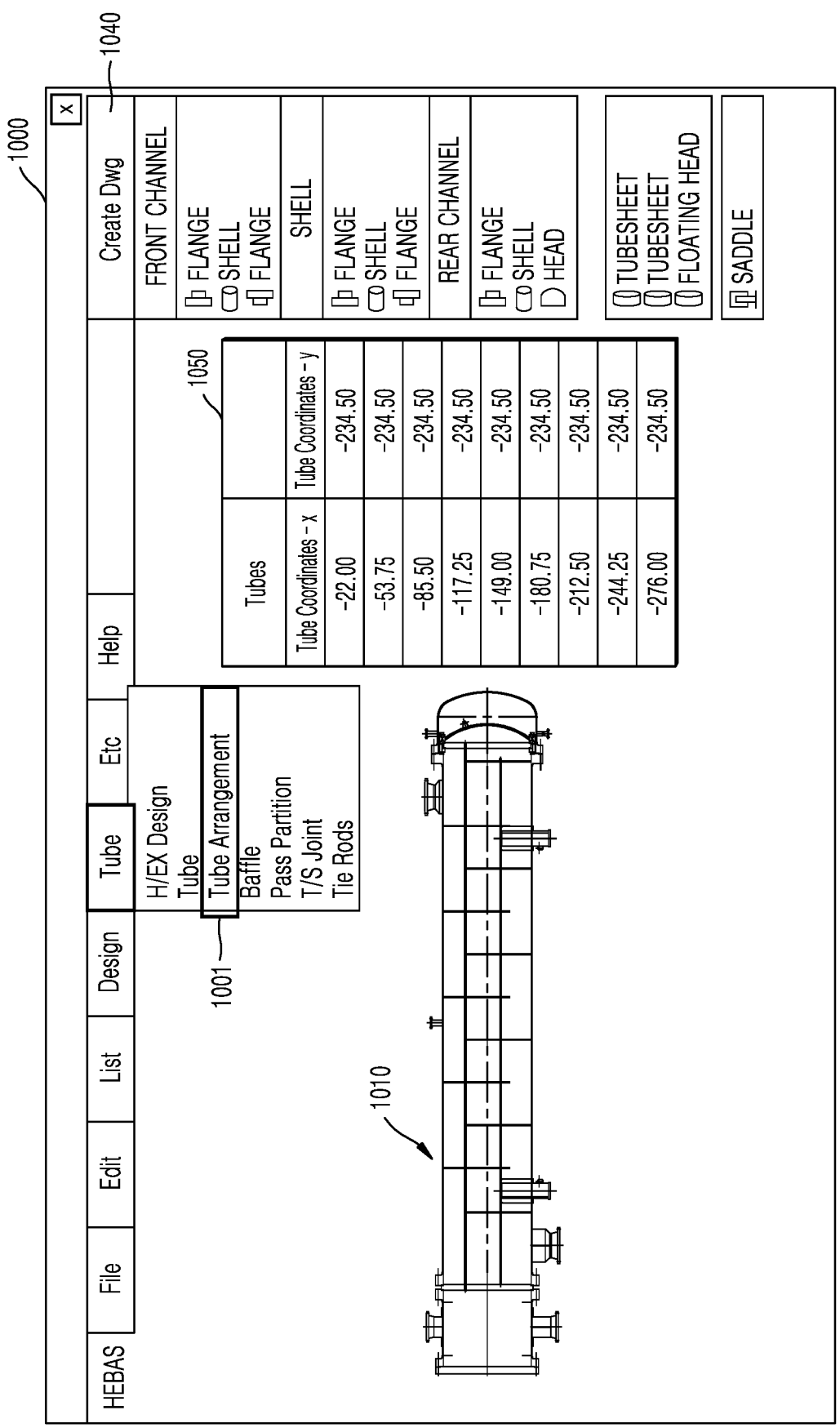
FIG. 10 illustrates an example in which a user selects a tube arrangement from a basic tab according to an embodiment.

In an embodiment, the viewer 900 may also provide basic tabs 920 for editing internal shapes of the heat exchanger. Tube 922, which is an example of the basic tabs 920, may be implemented such that information such as Tube Arrangement, Baffle, and Pass Partition may be selected, and information on the selected item may be provided. Referring to FIG. 10, when a user selects Tube Arrangement 1001, a viewer 1000 may overlay a shape display section 1010 with thermal data values 1050.

Figure 11:
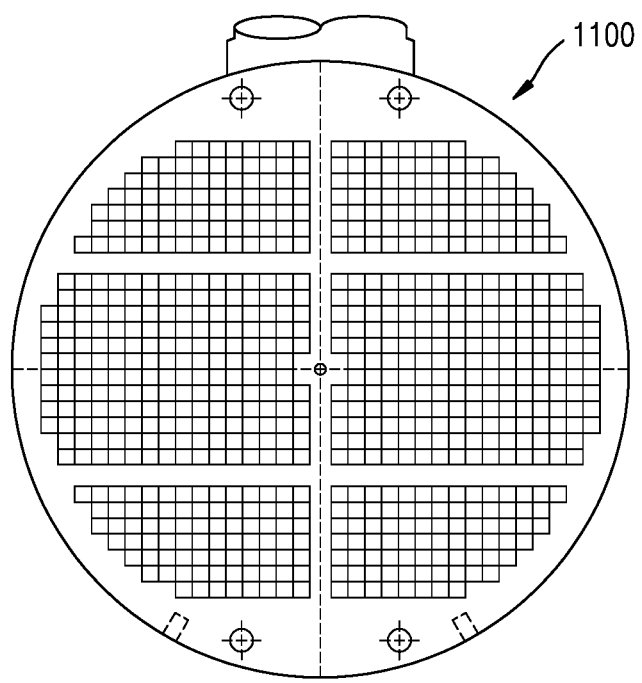
FIG. 11 illustrates an example in which a tube arrangement is generated as a CAD drawing according to an embodiment.

FIG. 11 illustrates an example of generating a tube arrangement 1100 as a CAD drawing when an automatic AutoCAD drawing generation interface 1040 is activated in a state overlayed with the thermal data values 1050 as shown in FIG. 10. Although FIG. 11 illustrates only the shape of the tube arrangement 1100, the CAD drawing of the tube arrangement 1100 may further include numerical information, tube hole number information, tube pitch information, scale information, hole information, or the like.

Figure 12:
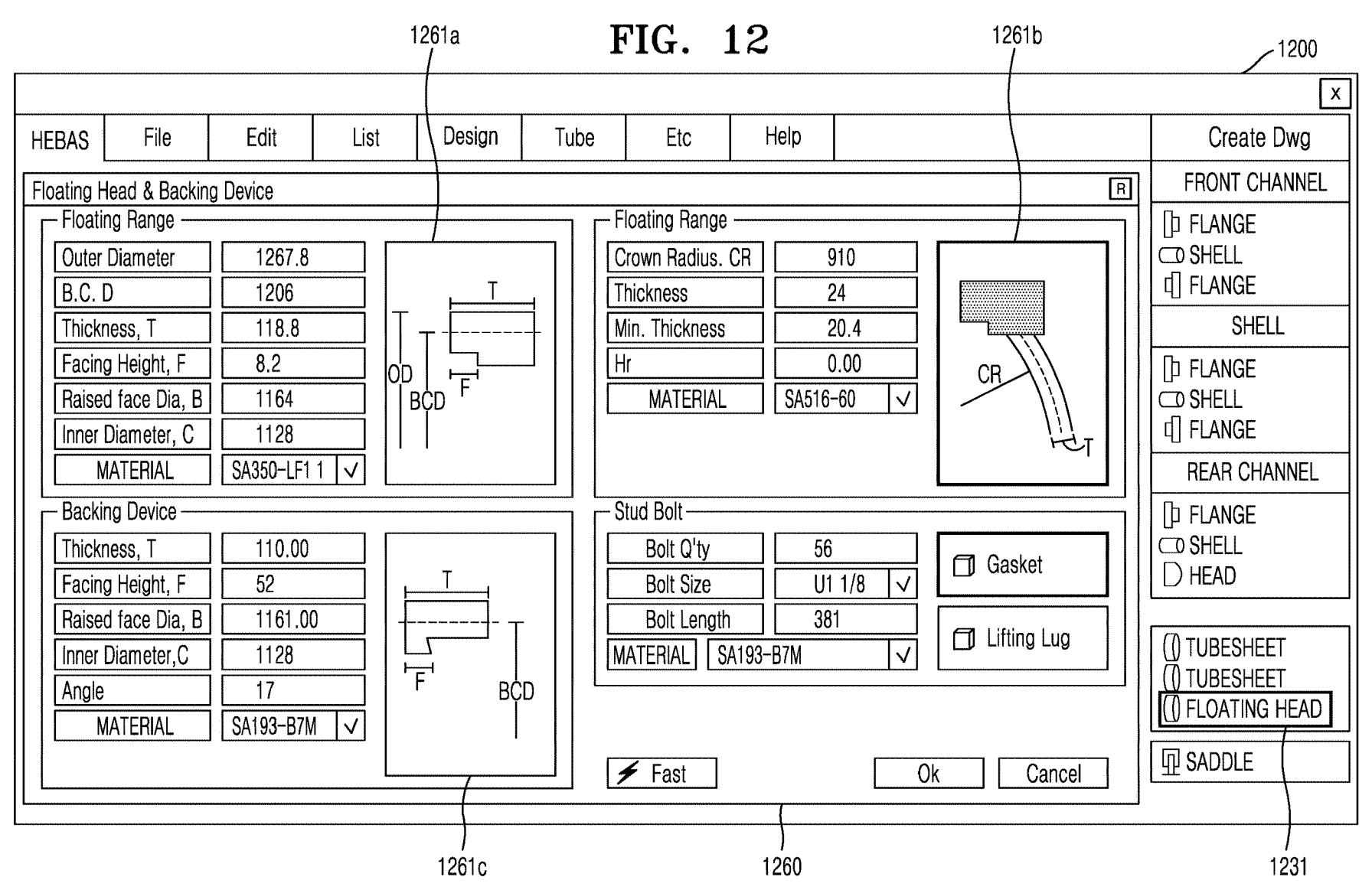

FIG. 12 illustrates an example of an information providing section according an embodiment. When an icon 1231 is selected and activated in a shape icon bar of a viewer 1200, information on at least one selected from the group consisting of an identifier, a type, a diameter, a size, a thickness, an angle, and a material is loaded from a data sheet together with a shape image such as shape images 1261a, 1261b, and 1261c corresponding to the activated icon 1231, and are provided through a separate pop-up window 1260. As described above, a plurality of shape images 1261a, 1261b, and 1261c may be provided.

Figure 13:
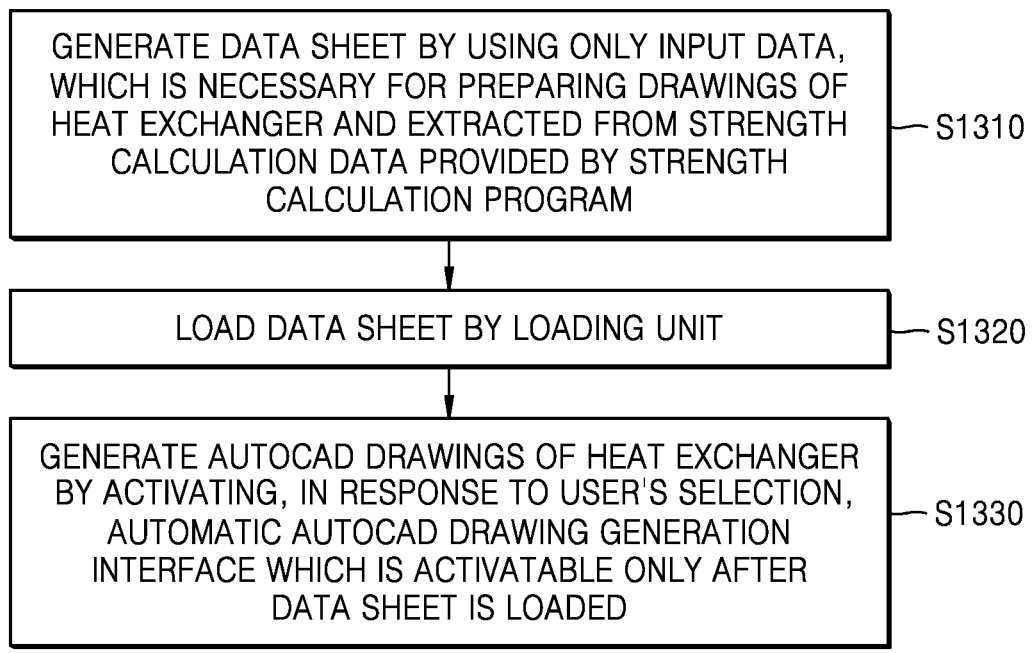
FIG. 13 is a flowchart illustrating an automatic AutoCAD drawing generation method according an embodiment.
Figure 14:
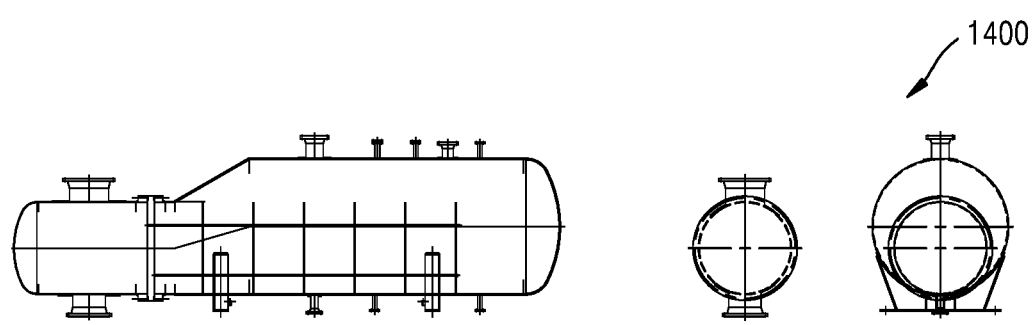
FIG. 14 illustrates an example of an AutoCAD drawing which is generated by activating an automatic AutoCAD drawing generation interface of an automatic AutoCAD drawing generation device according an embodiment.

FIG. 13 is a flowchart illustrating a method for automatically generating AutoCAD drawings according an embodiment.

A preprocessing unit may generate a data sheet by using only input data, which is necessary for preparing drawings of a heat exchanger and extracted from strength calculation data provided by a strength calculation program (S1310). A receiving unit may receive the data sheet, and a loading unit may load the data sheet in a viewer (S1320). When the loading of the data sheet is completed, an automatic AutoCAD drawing generation interface, which is activatable only after a data sheet is loaded, may be activated as being selected by a user, and AutoCAD drawings of the heat exchanger may be generated (S1330).

The methods of the embodiments may be implemented in the form of program instructions which are executable using various types of computers and may be recorded in a computer-readable medium. The computer-readable medium may include one selected from the group consisting of program instructions, data files, data structures, and combinations thereof. The program instructions recorded on the medium may be specially designed and configured for the present disclosure, or may be selected from program instructions known and available to those of ordinary skill in the computer software industry.

As described above, according to the automatic AutoCAD drawing generation device and method of the one or more of the above embodiments, users do not need to check strength calculation data directly from documents or electronic files, input the checked strength calculation data to drawing tools of an AutoCAD program, and manually generate drawings. In addition, errors caused by missing data or the like in the process of manually generating drawings may be prevented.

In addition, a long design or drawing time necessary for users to extract drawing data piece by piece and input the extracted drawing data may be saved, and thus the overall manufacturing period may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A device for automatically generating AutoCAD drawings, the device comprising:
a preprocessing unit configured to extract only input data having a first format, which is necessary for generating drawings of a heat exchanger, from strength calculation data provided by a strength calculation program, and then convert the input data into a data sheet having a second format according to a given rule or reference;
a loading unit configured to load the data sheet; and
a viewer configured to use the loaded data sheet to display at least one selected from the group consisting of a shape of the heat exchanger and information on each of objects of the heat exchanger,
wherein the viewer comprises an automatic AutoCAD drawing generation interface which is activatable only after the data sheet is loaded and is configured to generate AutoCAD drawings of the heat exchanger displayed on the viewer as being activated by a user's selection after the data sheet is loaded, and
the input data comprises both mechanical data and thermal data.

2. The device of claim 1, wherein the viewer comprises:
a shape display section configured to display the shape of the heat exchanger;
a shape icon bar providing icons related to the shape of the heat exchanger; and
a basic tab providing information on the objects of the heat exchanger.

3. The device of claim 2, wherein the shape icon bar is divided into a front channel, a shell, and a rear channel, and displays icons respectively forming the front channel, the shell, and the rear channel; and the front channel, the shell, and the rear channel comprise at least one icon selected from the group consisting of a flange, a shell, and a head.

4. The device of claim 3, wherein the shape icon bar comprises at least one of a tube sheet, a floating head, and a baking device.

5. The device of claim 2, wherein the icons related to the shape of the heat exchanger are displayed on the shape icon bar only when the mechanical data or the thermal data is provided from the data sheet.

6. The device of claim 1, wherein the thermal data comprises thermal rating results for a tube arrangement.

7. The device of claim 6, wherein the thermal rating results are obtained by inputting values extracted from the Heat Transfer Research Institute (HTRI) to the strength calculation program.

8. The device of claim 1, wherein the preprocessing unit comprises:
a data extraction unit configured to extract at least one piece of data, which corresponds to a preset item for each of the objects of the heat exchanger, from a preset position of the input data having the first format for generating a drawing of each of the objects of the heat exchanger;
a mapping table generation unit configured to generate a mapping table providing general information, which comprises unit information corresponding to the preset item, for generating the drawing of each of the objects of the heat exchanger; and
a data sheet generation unit configured to generate the data sheet having the second format based on the at least one piece of data extracted from the preset position or data in the mapping table.

9. The device of claim 2, wherein the viewer further comprises an information providing section configured such that when an arbitrary icon is selected in the shape icon bar, the information providing section loads information on at least one selected from the group consisting of an identifier, a type, a diameter, a size, a thickness, an angle, and a material from the data sheet together with a shape image corresponding to the selected icon, and provides the loaded information and the shape image through a separate pop-up window.

10. A method of automatically generating AutoCAD drawings, the method comprising:
  generating a data sheet by using only input data which is necessary for generating drawings of a heat exchanger and obtained from strength calculation data provided by a strength calculation program, wherein a preprocessing unit extracts only the input data in a first format, which is necessary for generating the drawings of the heat exchanger, from the strength calculation data provided by the strength calculation program, and then converts the input data into the data sheet in a second format according to a given rule or reference,
  wherein the generating of the data sheet includes
    extracting, by a data extraction unit, at least one piece of data, which corresponds to a preset item for each of objects of the heat exchanger, from a preset position of the strength calculation data having the first format for generating a drawing of each of the objects of the heat exchanger;
    generating, by a mapping table generation unit, a mapping table providing general information, which comprises unit information corresponding to the preset item, for generating the drawing of each of the objects of the heat exchanger; and
    generating, by a data sheet generation unit, the data sheet in the second format based on the at least one piece of data extracted from the preset position or data in the mapping table;
  loading the data sheet by a loading unit; and
  generating AutoCAD drawings of the heat exchanger by activating an automatic AutoCAD drawing generation interface by a user's selection, the automatic AutoCAD drawing generation interface being activatable only after the data sheet is loaded,
  wherein the input data comprises both machine data and thermal data.

11. The method of claim 10, wherein the thermal data comprises thermal rating results for a tube arrangement.

12. The method of claim 10, wherein the thermal data comprises thermal rating results obtained by inputting values extracted from the Heat Transfer Research Institute (HTRI) to the strength calculation program.

13. A non-transitory recording medium recorded thereon a program for executing the method of claim 10.

\* \* \* \* \*